(No Model.)
A. P. BROOKE.
PRESS AND MOLD FOR MOLDING GLASS.
No. 275,984. Patented Apr. 17, 1883.
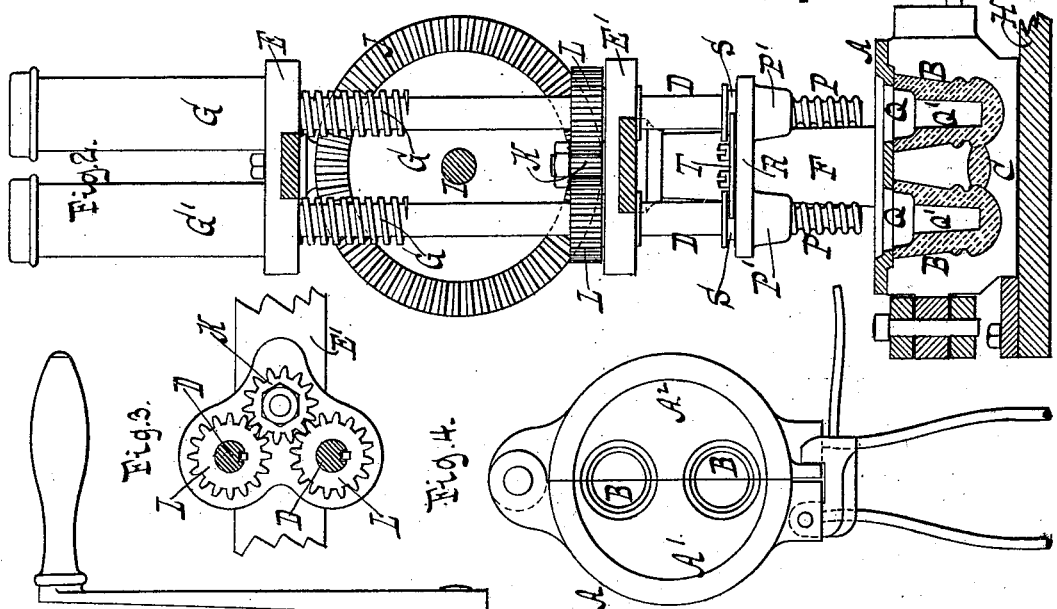
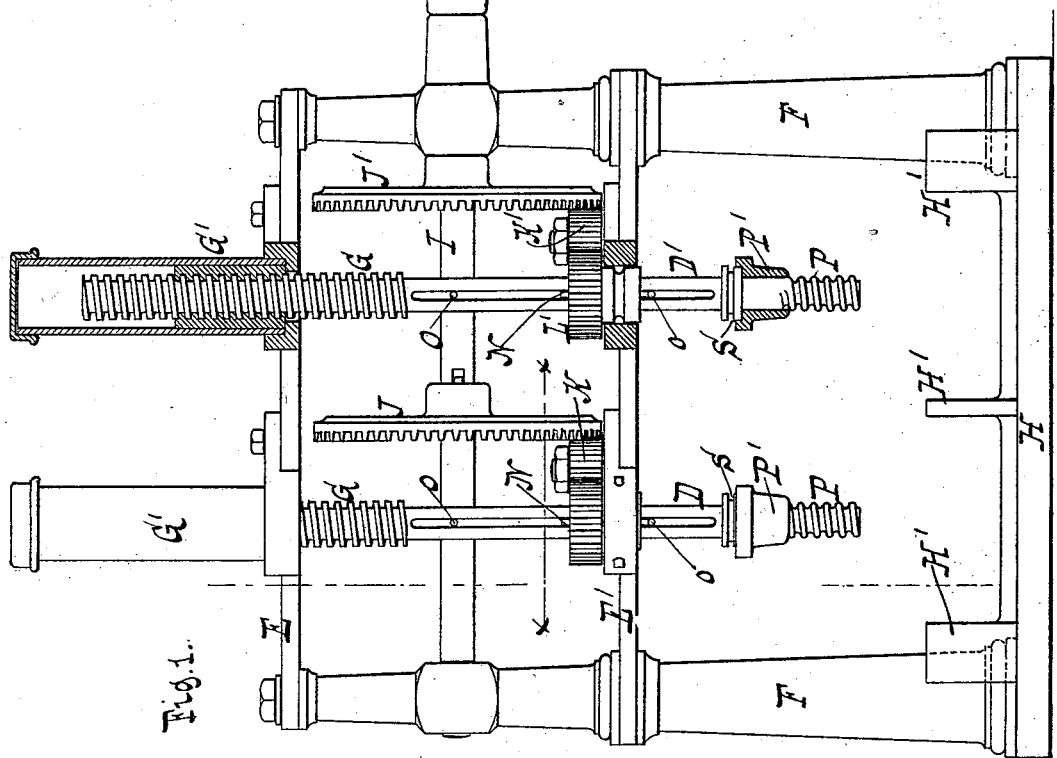
WITNESSES:
INVENTOR
Aries P. Brooke.
BY Van Santvoord & Hauff
ATTORNEYS

UNITED STATES PATENT OFFICE.

ARIES P. BROOKE, OF WOODBURY, NEW JERSEY, ASSIGNOR TO WILLIAM BROOKFIELD, OF BROOKLYN, NEW YORK.

PRESS AND MOLD FOR MOLDING GLASS.

SPECIFICATION forming part of Letters Patent No. 275,984, dated April 17, 1883.

Application filed January 24, 1883. (No model.)

*To all whom it may concern:*

Be it known that I, ARIES P. BROOKE, a citizen of the United States, residing at Woodbury, in the county of Gloucester and State of New Jersey, have invented new and useful Improvements in Presses and Molds for Molding Glass, of which the following is a specification.

This invention relates to molds and presses for casting screw glass insulators for telegraphic uses, and other articles of glass or other similar material, it being especially adapted to such molds and presses wherein a series of two or more articles is produced in one operation.

The peculiarities of the mold and press constituting my invention are hereinafter fully described, and illustrated in the accompanying drawings, in which Figure 1 represents a front elevation, partly in section, and omitting the mold. Fig. 2 is a vertical cross-section including the mold. Fig. 3 is a horizontal section on the line $x\,x$, Fig. 1, showing a portion of the gearing. Fig. 4 is a plan or top view of the mold.

Similar letters indicate corresponding parts.

The letter A designates a mold, which is constructed with a series of matrices or cells, B, of the proper shape for casting the desired articles. In the example shown two such matrices are used; but it should be understood that the number may be increased as circumstances or the views of manufacturers may render expedient.

In order to insure the uniformity in weight and thickness of the articles cast in the mold, it is necessary to distribute the material used for casting in equal quantities to the series of matrices, and to effect this purpose I have connected the matrices B together by means of a passage or gate, C, so that one communicates with the other, and hence, if the material left in the matrices when, as is usual, it is cut off at the top of the mold is unequal in quantity, the surplus or excess of material in one matrix will run into the other, thus compensating for the deficiency therein. When the number of the matrices is greater than two, the passage or gate is continued so on to connect the adjacent matrices. When the cast articles are removed from the mold, the link formed by the portion of material filling the passage or gate C is broken off, and in order to leave the surfaces of the articles plain or smooth it is necessary that such link shall break off at its junctions with the articles. This object I attain by contracting the passage or gate C at or near the ends where it enters the matrices B, as shown, so that the link becomes weakest at those places and has a tendency to break off thereat, in distinction from between the ends.

To allow the removal of the cast articles from the mold, the latter is divided in a vertical plane in two sections, A' A², which are hinged together at one end and provided with a suitable fastening at the opposite end, the line of division between the sections intersecting the matrices B and their connecting gate or channel.

In applying the mold to use it is put into a press which embodies in its structure a series of plungers, D, equal in number and similar in arrangement to the matrices B, so that these plungers are adapted to the mold. In the example shown two sets of plungers are used, the letter D' indicating the second set, for the purpose of allowing the alternate employment of two molds, and the proper positions of the molds are determined by guides H', attached to the bed H of the press. Said plungers D or D' extend through cross-heads E E', which are supported by standards F, rising from the press-bed H, the head E being at the top and the head E' intermediate of the top and bottom of the standards.

On the upper part of each plunger D or D' is formed a screw-thread, G, whereby it engages a threaded guide, G', fixed to the upper cross-head, E, and if a revolving motion is imparted to the plungers in reverse directions they are caused to perform also a vertically-reciprocating motion by the action of such thread. The revolving motion of the plungers is produced by a driving-shaft, I, which has its bearings in the standards F, and carries a crown-wheel, J or J', meshing with a pinion, K or K', which in turn meshes with a pinion, L or L', on the plungers, so that the pinion K or K' is a medium for connecting the pinions L or L' of adjacent plungers with the crown-wheel. The pinions L or L' of the plungers engage therewith by means of a feather-key, N, thus allowing the vertical movement of the plungers independently of the pinions, which are stationary in a vertical plane, and at the proper places on the plungers are arranged stops o, for determining their extreme upper and lower positions.

When the apparatus is used for molding glass insulators or other articles with an internal screw-thread, the plungers D or D' are provided, respectively, at the lower end with a former, P, having a screw-thread which corresponds in pitch to the thread G, and the glass or other material contained in the matrices B having first been subjected to the action of plain formers, the threaded formers P are made to act thereon with the desired effect by imparting to the plungers a compound revolving and vertically-reciprocating motion.

In the manufacture of screw glass insulators the plain formers are respectively shaped to produce in the glass what is known as a "petticoat," it being a plain wall, Q, Fig. 2, at the mouth of the insulator, terminating on the inner surface in a rounded shoulder, where it joins the socket Q', intended to receive the thread. In order to preserve the shape of this petticoat in the action of the threaded former, the latter is commonly provided with a shoulder which is similar in shape to the interior of the petticoat and enters therein in the descent of the former. The shoulder, however, has heretofore been made upon the threaded former to revolve therewith, and is objectionable on account of its grinding action on the glass, due to the revolving motion. Such objection I have overcome by making the shoulders P' of the threaded formers stationary in the revolution of the formers, together with the plungers, they, however, sharing the vertical movement of the plungers. To this end the shoulders P' are made in form of sleeves which embrace the formers P, and are connected with each other and also with the plungers D or D' by a bridge, R, the latter engaging with a circumferential groove, S, in the plungers by means of an attached plate, T, so that the plungers revolve independently of the sleeves, but at the same time carry the sleeves up and down with them, thus retaining the sleeves in proper relation to the formers. The stationary sleeves P' can also be connected to the plungers independently of each other by providing the sleeves with vertical guides on a suitable part of the machine-frame, and hence this feature of my invention is adapted to a press having a single plunger operating substantially in the manner herein described.

Heretofore a glass mold has been constructed with a central chamber, around which is arranged an annular series of molds, each connecting with the chamber by a separate channel, such chamber serving to receive the molten glass, which is simultaneously forced into all the molds by a descending plunger; but in such it is impossible for an excess of glass forced into one mold to freely pass into an adjacent mold by reason of the plunger being necessarily made to accurately fit the glass-receiving chamber.

What I claim as new, and desire to secure by Letters Patent, is—

1. In a mold for molding glass or other similar material, a series of matrices having open ends to receive the molten glass, and connected at or adjacent to their other ends by an unobstructed channel interposed between the two matrices, whereby an excess of molten glass in one matrix can freely flow into the adjacent matrix, substantially as and for the purpose described.

2. In a mold for molding glass or other similar material, the combination of a series of matrices having open upper ends for the introduction of the molten glass, with an unobstructed channel interposed in a horizontal plane between the matrices, and closed except at its ends, where it communicates with the matrices, whereby an excess of glass in one matrix is free to pass into the adjacent matrix, substantially as described.

3. A mold for molding glass or other similar material, having a series of matrices connected together by the channel C, and made in two sections which are divided from each other in a line intersecting both the matrices and channel.

4. In a compound press for molding articles of glass or other similar material, the combination of the mold having a series of matrices and a passage or gate connecting the adjacent matrices with a series of plungers adapted to said matrices of the mold, and a mechanism for imparting a compound revolving and vertically-reciprocating motion to the plungers, substantially as described, for the purpose set forth.

5. In a compound press for molding articles of glass or other similar material, the combination of a plunger having its lower end provided with a screw-threaded former, a non-rotating sleeve on the former connected with the plunger to share its vertical movement, and a mechanism for imparting a compound revolving and vertically-reciprocating motion to the plunger, substantially as described, for the purpose set forth.

6. In a compound press for molding articles of glass or other similar material, the combination of a series of plungers having their lower ends provided with screw-threaded formers, the non-rotating sleeves of the formers connected with each other and with the plungers, and a mechanism for imparting a compound revolving and vertically-reciprocating motion simultaneously to all the plungers, substantially as described, for the purpose set forth.

7. In a compound press for molding articles of glass or other similar material, the combination of a series of plungers having their lower ends provided with screw-threaded formers, the non-rotating sleeves of the formers, and the bridge connecting the sleeves with each other and with the plungers, substantially as described, for the purpose set forth.

In testimony whereof I have hereunto set my hand and seal in the presence of two subscribing witnesses.

ARIES P. BROOKE. [L. S.]

Witnesses:
E. F. KASTENHUBER,
WILLIAM MILLER.